United States Patent

Shimazaki

[11] Patent Number: 5,131,785
[45] Date of Patent: Jul. 21, 1992

[54] HANDLE SECURING ARRANGEMENT

[75] Inventor: Mitsuo Shimazaki, Akishima, Japan

[73] Assignee: Tachi-S Co. Ltd., Japan

[21] Appl. No.: 635,292

[22] Filed: Dec. 28, 1990

[51] Int. Cl.$^5$ ............................................. B25G 3/18
[52] U.S. Cl. .................................. 403/326; 403/155; 285/321
[58] Field of Search ................. 403/326, 155, DIG. 7; 292/353; 285/321

[56] References Cited

U.S. PATENT DOCUMENTS

| | | | |
|---|---|---|---|
| 1,882,625 | 10/1932 | Jacobi | 292/353 |
| 3,270,124 | 8/1966 | Rawls et al. | 403/155 X |
| 3,477,309 | 11/1969 | Sprecher | 292/353 X |
| 4,630,958 | 12/1986 | McCallister | 403/DIG. 7 |

Primary Examiner—Andrew V. Kundrat
Attorney, Agent, or Firm—Oldham, Oldham & Wilson Co.

[57] ABSTRACT

An arrangement for securing an operation handle to a drive shaft associated with a device in an automotive seat, in which a means is provided for preventing the handle against a sliding movement on the drive shaft in its longitudinally axial direction.

5 Claims, 5 Drawing Sheets

HANDLE SECURING ARRANGEMENT

BACKGROUND OF THE INVENTION

1. Field of the Invention

The present invention relates to an arrangement for securing a handle or an operation handle to a drive shaft in an automotive seat, as with a handle for operating such device as a lumbar support device or a seat position adjustment device.

2. Description of Prior Art

Reference is made to FIGS. 1, 2, 3A and 3B which show a conventional handle securing arrangement for use with a lumbar support device (not shown).

Referring to FIGS. 2, 3A and 3B, reference numeral (1) denotes an operation handle for controlling motions of the lumbar support device. The operation handle (1) has a hub (1a) for spline connection with a drive shaft (2). In this type of handle securing arrangement, the hub (1a) is formed, at each of its lateral sides, with a slit (1b) opened generally along the semi-circular cross section of the hub (1a), forming thus a pair of spaced-apart slits (1b)(1b) circumferentially of the hub (1a), at the right and left sides symmetrically relative to the central axis of the hub (1a), with the formation of the drive shaft (2) being that its forward end is machined in a male threaded way, forming a male threaded spline portion (2b) to be spline connected into a female threaded portion formed in the hub (1a), and that a circular recessed groove (2a) is formed such as to be disposed generally in alingment with the two slits (1b) of the hub (1a). As shown in FIG. 3A, when spline connecting the hub (1a) to the drive shaft (2), a snap ring (3) is attached into the juxtaposed slits (1b) and groove (2a) from both sides of the hub (1), thereby resiliently retaining the operation handle (1) against removal or falling-off out of the shaft (2).

However, as seen from FIG. 3B, the fact that both slits (1b) and groove (2a) are greater in in dimensions than the cross-sectional outer diameter of the snap ring (3), in particular, as indicated by the designation (L1), conventionally, the groove (2a) of the shaft (2) is of a great width relative to that of the slits (1b), results in creating a play for the snap spring (3) and thus causing an unstable sliding movement or wobbling of the handle (1) upon the shaft (2) in the axial direction, as understandable by the arrow in FIG. 3A. Consequently, such wobbling of the handle (1) emits an unpleasant noise to pose a disadvantageous problem in controlling the lumbar support device.

SUMMARY OF THE INVENTION

With the above-stated drawbacks in view, it is therefore a first purpose of the present invention to provide an improved handle securing arrangement for an automotive seat, which prevents a sliding movement of hub of the handle or operation handle upon a drive shaft associated with a device in the seat.

In achieving the purpose, in accordance with the present invention, a leaf spring is provided at the bottom of inner bore formed in the hub of operation handle. Thus, the drive shaft is urged by the leaf spring in a direction causing a slit of the hub and an annular groove of the drive shaft to retain the snap ring therebetween, whereby there ie eliminated a play at the snap ring, and the hub is prevented against sliding movement upon the shaft.

In another aspect of the invention, here, the snap ring per se is so twisted as to absorb the play in question.

It is a second purpose of the present invention to avoid a sliding movement of the operation handle upon the drive shaft, irrespective of a play being present at the snap ring.

To this end, a plurality of protrudent stripes are formed in the inner bore of the hub in a longitudinally coaxial relation therewith, so that those protrudent stripes are in a frictional or pressure contact with the circumference surface of the drive shaft.

DETAILED DESCRIPTION OF PREFERRED EMBODIMENTS OF THE INVENTION

First of all, it should be understood that the description will be made on the basis of the aforementioned prior art since the present invention aims at providing improvements upon the prior art, and therefore, all like designations given in the prior art description above refer to all like designations to be given in the herein description. Hence, similar parts and components will not be described again for the sake of simplicity.

Figure 1:
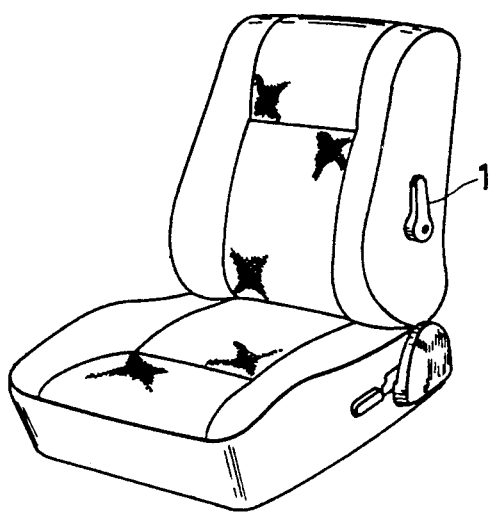
FIG. 1 is a perspective view of an automotive seat to which is applied a conventional handle securing arrangment.
Figure 2:
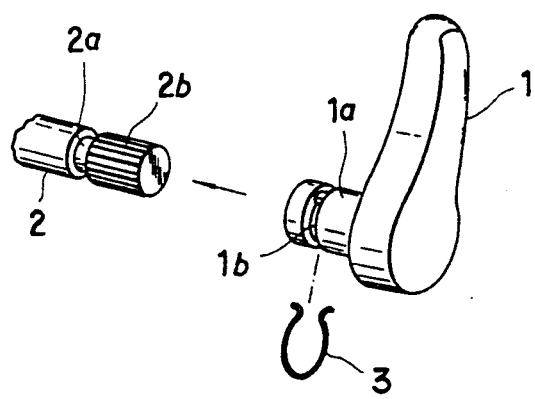
FIG. 2 is an exploded perspective view showing the prior art arrangment, in which the operation handle is shown as being separate from the drive shaft.
Figure 3:
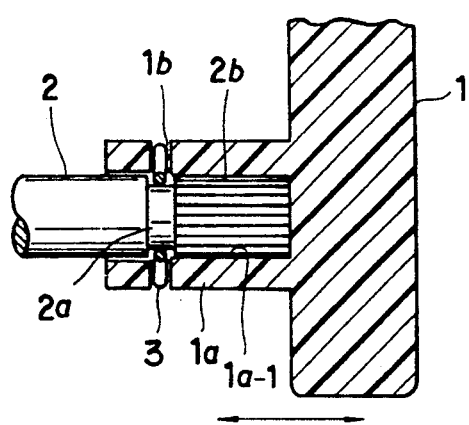
FIG. 3(A) is a partial sectional view showing the prior art arragement, in which the operation handle is shown as being secured firmly to the drive shaft.
FIG. 3(B) is an enlarged partial sectional view in connection with FIG. 3(A)
Figure 3:
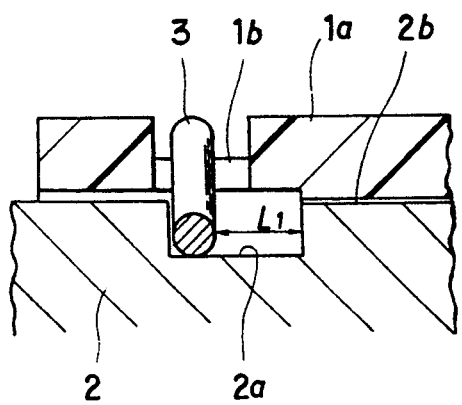
Figure 4:
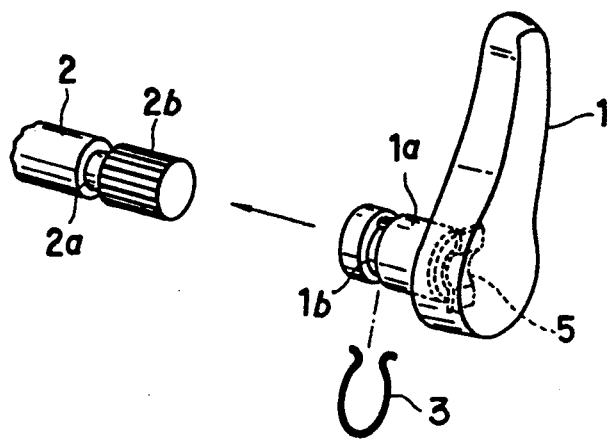
FIG. 4 is an exploded perspective view showing a first embodiment of handle securing embodiment, in accordance with the present invention.
Figure 5:
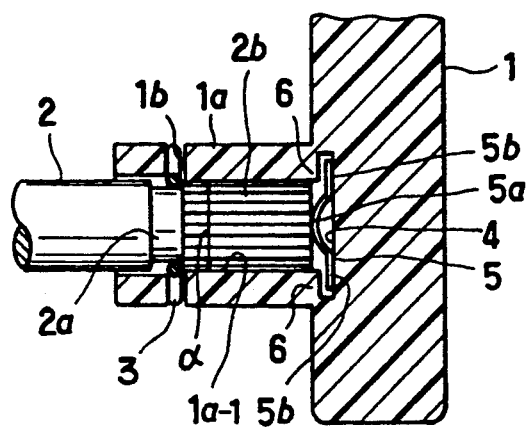
FIG. 5 is a sectional view of a principal part of the first embodiment.

Referring to FIGS. 4 and 5, there is illustrated a first embodiment of handle securing arrangement in accordance with the present invention. This embodiment is identical in basic construction to the prior art, except that means is provided for preventing the hub (1a) of the operation handle (1) against axial sliding movement upon the shaft (2).

Such preventive means comprises a hollow zone (4) formed at the bottom of the inner bore (1a-1) of the hub (1a), as seen from FIG. 5, and a leaf spring (5) secured in the hollow zone (4). Specifically, the hollow zone (4) is of a circle-like form having a dimensions greater than the diameter of the inner bore (1a-1), thus constituting a T-shaped cross-section of bore within the handle (1) as in FIG. 5. The leaf spring (5) is formed greater in dimensions than the hub inner bore (1a-1), and comprises a central cambered part (5a) and a pair of horizontal end parts (5b)(5b). The two end parts (5b) of the spring (5) bear against the stepped area (6) defined between the hollow zone (4) and hub inner bore (1a-1), while the cambered part (5a) of the same projected to contact the end of the shaft (2). Accordingly, the cambered part (5a) resiliently urges the shaft (2) to move away from bottom of the hub inner bore (1a-1), whereby the annular groove (2a) of the shaft (2) is kept displaced forwardly with regard to the slit (1b) of the hub (1), with the result that the snap ring (3) is securely retained between the slit (1b) and groove (2a), thus eliminating a play at the snap ring (3). Therefore, the hub (1a) of the handle (1) is prevented against axial sliding movement upon the shaft (2).

Figure 6:
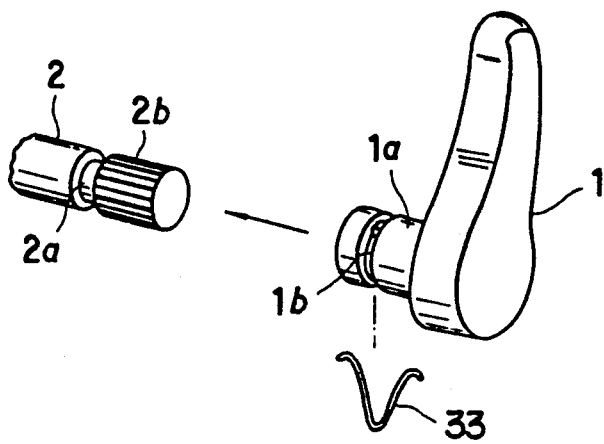
FIG. 6 is an exploded perspective view showing a second embodiment of the invention.
Figure 7:
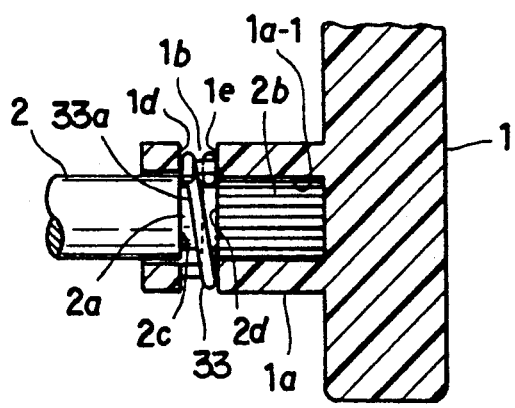
FIG. 7 is a sectional view of a principal part of the second embodiment.
Figure 8:
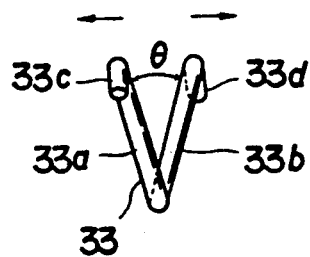
FIG. 8 is a side view of a deformed hog ring in the seond embodiment.

FIGS. 6, 7 and 8 show a second embodiment of the present invention. According thereto, in the construction same with the prior art, the snap ring (3) is deformed by twisting its right- and left-side halves in a direction opposite to each other, into the one assuming a V-shaped configuration as viewed from the side, as can be seen from FIG. 8. This deformed snap ring (33) comprises outwardly turned end portions (33c)(33d) and thus-twisted ring halves (33a)(33b) which are inclined away from each other, whereupon two repercussive forces are given in this ring (3) in a mutually opposed direction, as inidcated by the arrows in FIG. 8. It should be noted here that the axial distance or spacing ($\theta$) between the two opposingly inclined ring halves (33a)(33b) be greater than the width of the annular groove (2s) of the shaft.

Thus-formed ring (33) is snap fitted into the juxtaposed slit (1b) and groove (2a) as in FIG. 7. As a result, the right-side end part (33d) and spring half (33b) are respectively abutted against the vertical wall (1e) of the slit (1b) and stepped wall (2d) of the annular groove (2a), while on the other hand the left-side end part (33c) (2a) is abutted against the opposite vertical wall (1d) of the slit (1b). In that way the hub (1a) is resiliently urged by the deformed snap ring (33) in a direction towards the the shaft (2) along its longitudinally axial direction, so that the forward end of the shaft (2) is kept inserted enough to contact the bottom of the hub inner bore (1b). Consequently, there is eliminated a play at the ring (33), which prevents the handle (1) against sliding movement upon the shaft (2).

Figure 9:
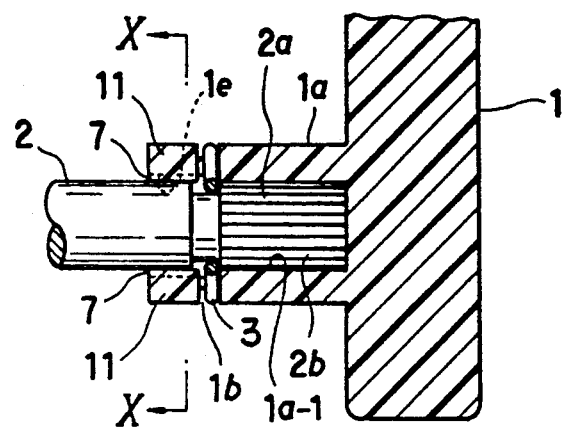
FIG. 9 is a sectional view showing a third embodiment of the invention.
Figure 10:
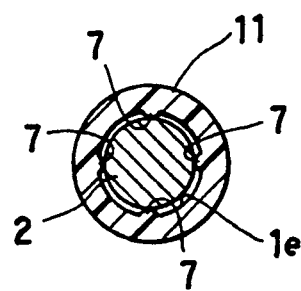
FIG. 10 is a sectional view taken along the line X—X in the FIG. 9.

FIGS. 9 and 10 show a third embodiment, wherein its structure is basically indentical to that of the prior art, but a slinging motion preventive means is provided in the hub (1a) of the handle (1). Namely, the hub (1a) is constructed at its free end part (11) such that the inner wall (1e) of the free end part (11) is formed with a plurality of protrudent stripes (7) extending along the longitudinal direction of the free end part (11) of the hub (1a). As best seen from FIG. 10, the protrudent stripes (7) are in a pressed contact with the corresponding circumferential surface of the shaft (2), whereby the hub (1a) is prevented against sliding movement upon the shaft (2).

Figure 11:
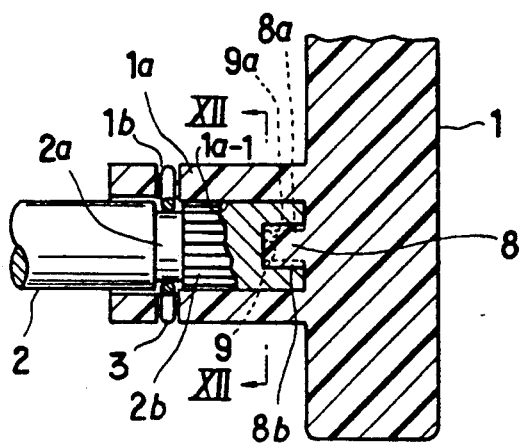
FIG. 11 is a partly broken sectional view showing a fourth embodiment of the invention.
Figure 12:
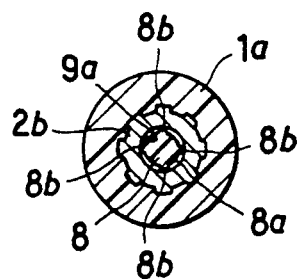
FIG. 12 is a sectional view taken along the line XII-—XII.

FIGS. 11 and 12 further show a fourth embodiment. While its basic construction is same with that of the prior art, this embodiment suggests provision of the cylindrical projection (8) at the bottom of the inner bore of the hub (1a) and further formation of a securing hole (9a) at the forward end surface of the shaft (2). The projection (8) is formed at its circumferential surface (8a) with plurality of protrudent stripes (8b). The securing hole (9a) is of a greater diameter than the outer diameter of the circumferential surface (8a) of the projection (8), but each of the protrudent stripes (8b) has a height slightly exceeding the diameter of the securing hole (9a). Both securing hole (9a) and projection (8) are disposed coaxially, whereupon as illustrated, when assembling together the handle (1) and shaft (2), the securing hole (9a) receives the projection (8), with the plural protrudent stripes (8b) being pressed against the inner surface of the hole (9a). Accordingly, the frictional effect is given between the hub (1a) and shaft (2) so as to avoid sliding movement of the handle (1) upon the shaft (2).

Figure 13:
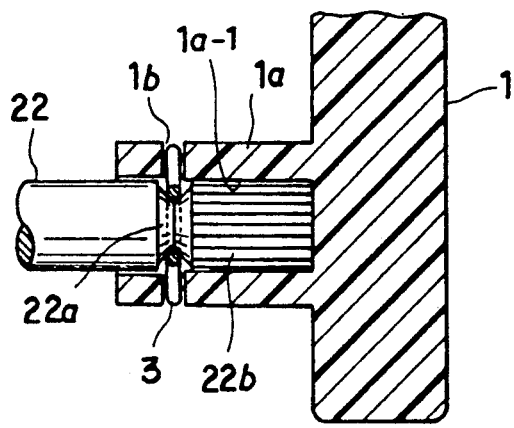
FIG. 13 is a sectional view showing a fifth embodiment of the invention.

FIG. 13 further show a fifth embodiment of the present invention, according to which there is provided another shaft (22) having an another annual groove (22), though other construction in this embodiment is same with that of the prior art.

As shown, the shaft (22) is formed with a spline portion (22b) and the annular groove (22). The annular groove (22a) is so formed to have a valley as different to the previously stated grooves (2a); otherwise stated, the groove (22a) is of a V-shaped cross-section, thus representing a neck-like recessed groove circumferentially of the shaft (22). With such groove (22a), the snap ring (3) rests in the acutely converged bottom of the groove (22a), and is thereby retained against movement. Accordingly, there is eliminated sliding movement of the handle (1) upon the shaft (2).

As described above, various modes of means for preventing movement of the hub (1a) of the handle (1) (that means to prevent sliding or wobbling of the handle (1) relative to the shaft (2)) are provided in accordance with the present invention. Insofar as the points of the invention will not depart from the scope and spirit of the appended claims, any other modifications, replacements and additions may be made to the invention.

What is claimed is:

1. In an operation handle which is spline connected to and retained by a snap ring to a drive shaft in an automobile against removal therefrom, wherein said handle has a hub which is formed with a slit and said drive shaft is formed with an annular groove circumferentially thereof, wherein said drive shaft is inserted in said hub, with said slit of said hub and said annular groove of said shaft being juxtaposed with each other, wherein the widths of said slit and said annular groove are greater than the cross-sectional diameter of the snap ring and wherein said groove is of greater width than said slit, and wherein said snap ring is attached over along both said slit and groove, an arrangement comprising:

a preventive means for preventing said hub against sliding movement on said drive shaft within a play given between said snap ring and said widths of said slit and groove, whereby said hub is retained against movement in a longitudinally axial direction of said drive shaft, said preventive means being provided between said hub and drive shaft.

2. The arrangement according to claim 1, wherein said preventive means comprises a plurality of protrudent stripes formed in the inner surface of said hub, said protrudent stripes being in a frictional contact with a circumference surface of said drive shaft, to thereby prevent a slidable movement of said hub upon said shaft.

3. The arrangement according to claim 1, wherein said preventive means comprises a hole formed at a forward end of said drive shaft and a cylindrical projection formed at a bottom of an inner bore of said hub, wherein said hole of said drive shaft and cylindrical projection are arranged in a longitudinally coaxial relation, wherein said cylindrical projection is formed at its cricumference surface with plural protrudent stripes which runs along the longidinal direction of said shaft, and wherein said cylindrical projection is secured in said hole of said drive shaft by virtue of said plural protrudent stripes being in a frictional contact with an inner surface of said hole of drive shaft, whereby there is prevented sliding movement of said hub upon said shaft.

4. The arrangement according to claim 1, wherein said preventive means comprises a leaf spring provided in said hub, which elastically presses said drive shaft in a direction to compensate for said play, thereby retaining said snap ring firmly between said slit and groove.

5. In an operation handle which is spline connected to and retained by a snap ring to a drive shaft in an automobile against removal therefrom, wherein said handle has a hub which is formed with a slit and said drive shaft is formed with an annular circular groove circumferentially thereof, wherein said drive shaft is inserted in said hub, with said slit of said hub and said annular groove of said shaft being juxtaposed with each other, wherein said snap ring is received in both said slit and said groove, wherein the widths of said slit and said annular groove are greater than the cross-sectional diameter of the snap ring and wherein said groove is of greater width than said slit, so that there is play for said snap ring, permitting the sliding movement of said handle upon said drive shaft, an arrangement comprising:
a preventive means for preventing said hub against sliding movement upon said drive shaft in a longitudinally axial direction thereof, said means being provided between said hub and said drive shaft.

* * * * *